United States Patent [19]

Fitch

[11] 3,754,890

[45] Aug. 28, 1973

[54] PROCESS FOR PRODUCING METALLIZED AGGLOMERATES AND RECOVERY OF NON-FERROUS VALUES FROM WASTE MATERIALS

[75] Inventor: Arthur L. Fitch, Mars, Pa.

[73] Assignee: Harsco Corporation, Wormleysburg, Pa.

[22] Filed: Sept. 17, 1971

[21] Appl. No.: 181,592

Related U.S. Application Data

[63] Continuation of Ser. No. 36,719, May 13, 1970, abandoned.

[52] U.S. Cl. ............................................. 75/3, 75/25
[51] Int. Cl. ............................................. C21b 1/30
[58] Field of Search ................................. 75/3, 25

[56] References Cited
UNITED STATES PATENTS

| | | | |
|---|---|---|---|
| 2,128,379 | 8/1938 | Spencer, Jr. | 75/1 |
| 2,215,734 | 9/1940 | Harder | 75/128 |
| 2,394,793 | 2/1946 | Maier | 75/3 |
| 2,855,290 | 10/1958 | Freeman | 75/3 X |
| 2,944,884 | 7/1960 | Halvorson | 75/3 X |
| 3,264,091 | 8/1966 | Ban | 75/3 X |
| 3,326,669 | 6/1967 | Stirling | 75/5 |
| 3,386,816 | 6/1968 | English | 75/33 |
| 3,403,018 | 9/1968 | Thom | 75/25 |
| 3,314,780 | 4/1967 | Holowaty et al | 75/3 |

*Primary Examiner*—Allen B. Curtis

[57] ABSTRACT

A process and system for producing metalized iron agglomerates and for recovery of zinc values from waste materials, in dust form, including comminuting and drying the dust. Collecting and separating the dust in accordance with the content of the zinc values and proportionately blending the dust to provide a product having a substantially uniform zinc value content for pelletizing into green balls. Drying and indurating the green balls and reducing the indurated balls with a reductant to provide highly metalized balls and volatilization of the zinc values. Recovering the volatilized zinc values, as exhaust gases, to provide metalized balls having a high iron content substantially free of zinc values.

6 Claims, 2 Drawing Figures

PROCESS FOR PRODUCING METALLIZED AGGLOMERATES AND RECOVERY OF NON-FERROUS VALUES FROM WASTE MATERIALS

This is a continuation of application Ser No. 36,719, filed May 13, 1970, now abandoned.

BACKGROUND OF THE INVENTION

The present invention relates to a process and apparatus system for producing metalized agglomerates and for recovering non-ferrous values from waste materials, and more particularly relates to the production of heat-hardened, highly metalized agglomerates from waste materials, such as metallurgical dust, suitable for use in steel making operations, such as in blast furnaces, oxygen steel making furnaces and the like. In addition, the invention relates to the recovery and removal of non-ferrous values, such as zinc, lead, sulphur and other impurities from the agglomerates so that the same can be economically and efficiently re-charged for use in metallurgical operations, such as in the blast furnace and the like, as aforesaid.

In present-day iron and steel making operations, an appreciable amount of dust in generated from the different processing methods, especially with the advent of the oxygen blown process. The strong emphasis on anti-pollution laws and regulations issued by federal, state and local agencies and governments has resulted in an increasing accumulation of large quantities of dust and slurry from dust-collecting and extracting installations. Moreover, the collection of dust from such metallurgical processes due, in part, to pollution abatement laws has, in turn, created another problem, that of disposing of the collected dust. Such dust is collected in electric precipitatior or other dust collecting devices of systems with the collected dust presently being disposed of either in dumping areas and/or being recirculated through in-plant sinter installations. However, the disposal areas around steel mills are becoming even more scarce, hauling distances are becoming longer and, therefore, the disposal of steel making dust is becoming prohibitively expensive. In addition, because of changes in iron and steel making processes, such sinter installations are in many instances expected to be phased out of operation.

It has been found that very fine dusts recovered from blast furnace or steel operations can be returned to the metallurgical processes only after treatment, such as agglomeration, briquetting, pelletizing or the like. In many cases, such prior treatment of the dusts must be accomplished together with other benefication because they generally contain metallurgically harmful constituents, such as zinc, lead, sulphur and the like. When the dust contains fairly high percentages of zinc and lead which is attributable to the scrap charges, the removal of such contaminants by sinter installation is no longer satisfactory. Accordingly, in locations where iron ore agglomerates are chiefly used as a charge material, the capacity of sinter plant installation is not adequate to handle the additional dust requirements. Moreover, it has been found necessary to find new methods and means of processing such dusts if storage is to be avoided which would otherwise require considerable expense and space consumption.

SUMMARY OF THE INVENTION

The present invention contemplates the processing of a variety of steel works dust from a plurality of sources for handling a volume of throughput irrespective of input (i.e. raw materials) or output (i.e. pellets) control conditions by a continuous, centralized system. The process and system of the invention relates to the benefication and agglomeration of waste materials containing ferrous values, such as iron oxide, and non-ferrous values, such as zinc, lead and sulphur, which material may be in dry or wet condition, in the form of filter cake or slurry, to produce heat-hardened pellets having a high metallic iron content; and the recovery and separation of such non-ferrous values to provide a highly metalized pellet free of zinc for re-charging into a metallurgical furnace, such as a blast furnace or the like. More specifically, the process comprises producing agglomerates from waste materials containing such values from one or more sources, comminuting and drying such material in dust form, collecting and separating the dust in accordance with the non-ferrous content thereof, proportionately blending said assorted dust to provide a product having a substantially uniform non-ferrous content, and then pelletizing said product. The invention further relates to the drying and indurating of said pellets to provide in the pellets sufficient strength for subsequent handling. The indurated pellets are then subjected to reduction conditions in a rotary kiln furnace with a reductant to reduce the ferrous values to highly metalized iron and to volatilize the non-ferrous values with separation of the volatilized values, as exhaust gases, to provide a highly metalized pellet substantially free of zinc. The invention further contemplates the separation and recovery of materials discharged from the kiln for recycling selectively with the comminuting, pelletizing and reduction steps to provide a continuous operation with minimum disposal to waste.

By the foregoing, and as will be further apparent from the following description and accompanying drawings, the present invention provides an improved process and apparatus system for recovering and separating ferrous and non-ferrous values from waste materials, such as precipitator dust, filter cake or the like, which materials can now be assimilated from a number of steel works and which obviates many difficulties, such as variables in the input control of the raw material, output control of the finished product and the like, heretofore attendant in prior processes. Accordingly, the present invention provides a highly consumable product out of materials which would otherwise constitute waste and hence, maximizes the economics and efficiency of the system. More specifically, the invention provides a heat-hardened or partially reduced pellet that is substantially free of zinc, and one that is sufficiently stable with minimum fines content to be acceptable for re-charge into a metallurgical furnace, such as the blast furnace. The finished pellet will contain not less than 60 percent total iron and preferably has an iron content in excess of 85 percent of which 80 percent is metallic iron. The pellet preferably contains not more than 10 percent —¼-inch fines and has not less than 100 pounds crushing strength, with less than 0.2 percent zinc. In addition, the process and system of the invention maximizes the recycling of fines for continuous operation of the system with minimum waste and minimizes the amount of contaminants distributed to the atmosphere and a maximum amount distributed as clean air.

DESCRIPTION OF THE PREFERRED EMBODIMENTS

Figure 1:
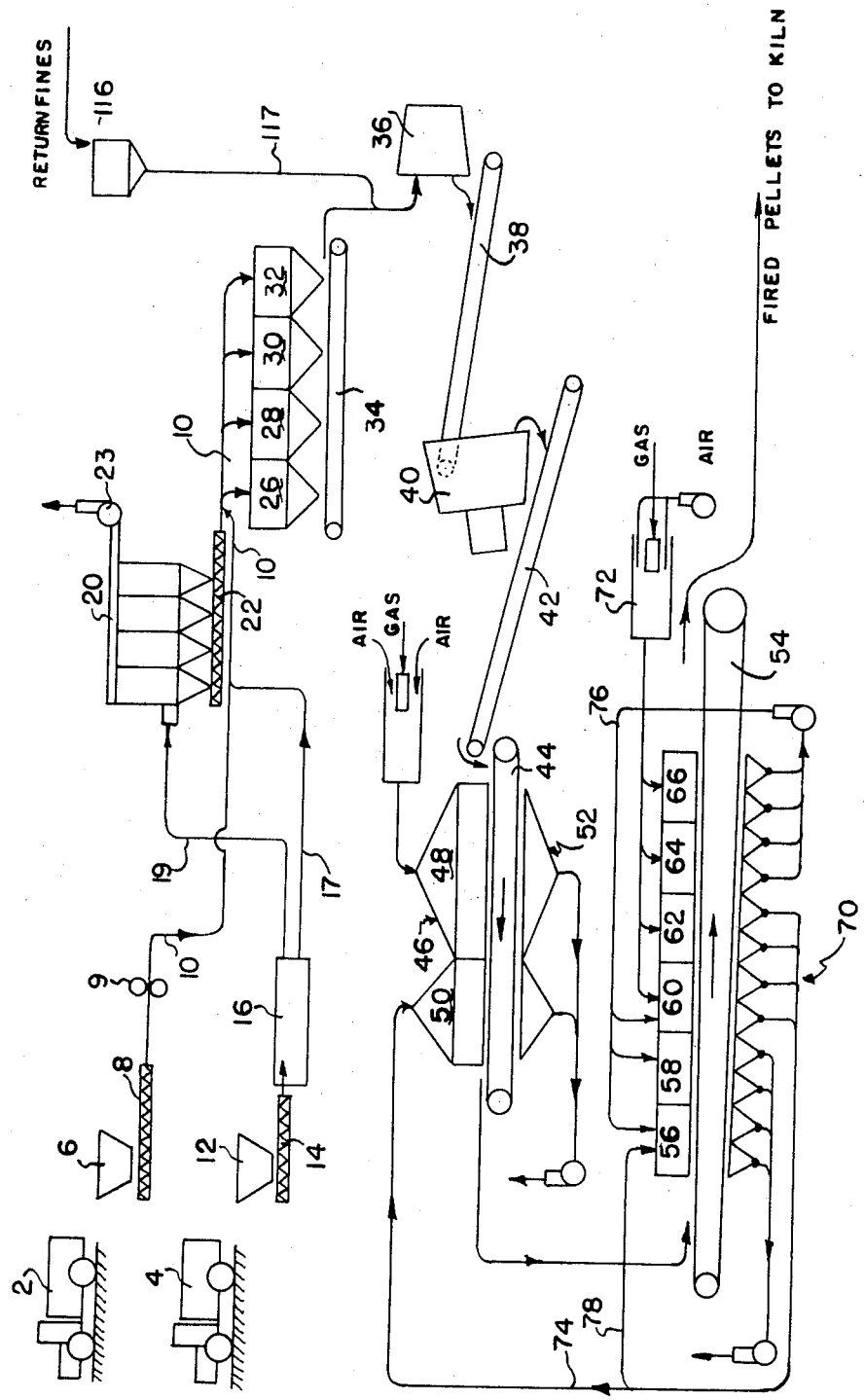
FIG. 1 is a schematic flow sheet representing the process and apparatus system for carrying out the benefication, agglomeration, drawing and indurating of the waste materials in accordance with the present invention.

Referring again to the drawings and in particular to FIG. 1 thereof, there is illustrated schematically the process and apparatus system of the invention for the benefication, agglomeration, drying and indurating of waste materials for the production of heat-hardened pellets for reduction in a rotary kiln furnace, as will be described in detail hereinafter. As shown, the waste dust to be processed may be recovered from a plurality of steel works and delivered to the work site for purposes of centralization by trucks 2 and 4 which may contain dry or wet dust, respectively, in the form of filter cake or slurry. The dry dust may be delivered from the truck 2 into a hopper 6 capable, for example, of holding 40 tons of dust. From the base of the hooper 6 the dry dust is discharged onto a screw conveyor 8 which, in turn, feeds the dry dust to a roll crusher 9 which may discharge the material onto a belt conveyor or the like 10 for delivery to a storage area, such as bins 26, 28, 30 or 32.

The truck 4 containing wet dust, in slurry or filter cake form, may be discharged into another hopper 12 capable of holding, for example, 40 tons of dust, which is discharged from the base of the hopper 12 onto a screw conveyor 14. The conveyor 14 transfers the wet dust through a dryer 16 where the moisture content thereof is preferably reduced to less than about 10 percent, preferably to about 8 percent.

The material which passes through the drier 16 is then passed partially through a filter bag dust collector 20 and partially directly to a storage area, or to storage bins 26, 28, 30 and 32. The material recovered by the dust collector may be removed by a screw conveyor 22 and deposisted on the conveyor 10, while the gas is removed by a vacuum producing device 23.

As shown, the collecting and separating system includes a plurality of bins 26, 28, 30 and 32 which are preferably covered and arranged to separately hold and/or store dust dependent upon the zinc oxide content thereof. For example, the zinc oxide content of the dust from the different steel works may vary from negligible amounts up to 30 percent, by weight. Preferably, high frequency sound bin level gauges (not shown) will automatically divert the flow of dust from one bin to the next via a rotating chute (not shown) to provide flexibility for statistical mixing and insurance of operation when one bin, for example, is inoperative. From the base of the respective bins the collected dust is fed onto table feeders and belt scales indicated diagrammatically at 34 for selectively and proportionately blending the dust based on the zinc oxide content, by weight, of the dust for subsequent pelletizing thereof. By this arrangement, the separate storage of dust with different percentages of zinc oxide content enables different materials to be blended in order to achieve a substantially uniform product for pelletization. Accordingly, such arrangement provides a highly controllable process for dezincification of the pellets during reduction, as hereinafter described.

From the feed belt conveyor 34, the proportioned dust product is delivered to a wetting drum 36, such as manufactured by the Stirling Sintering Corporation or by other ccmpanies. The dust may be moistened in the drum 36 and then transferred via a belt conveyor 38 for discharge into a drum pelletizer 40 such as manufactured by the Stirling Sintering Corporation, or by others. In the pelletizer 40, properly sized pellets are discharged while undersize and oversize materials are internally recycled. From the pelletizer 40, the pellets are discharged onto a conveyor belt 42 for discharge onto a drying belt 44 of a dryer unit 46. Preferably, the belt 44 is of a wire mesh construction to provide a permeable bed for one or more layers of pellets received thereon. The pellets are dried on the belt 44 by means of an overhead hot air system 46 which, in the form shown, receives air fuel in the form of gas via a hood 48. In addition, the unit 46 receives recycled exhaust gases from the indurating step via a hood 50. Preferably, the pellets are dried at a temperature in the range between ambient temperature and 300°F. The hot air drying gases are drawn through the bed of pellets and belt 44 via an exhaust system 52. By this arrangement, slowly rising temperatures are applied to the pellets so that the same remain undamaged while on the belt 44 and have sufficient strength to be dropped — without breakage — to the indurating step.

From the belt 44, the pre-dried pellets are delivered to a grate 54 for heat-hardening the dried green pellets at successively increased temperatures. For example, the grate 54 is preferably covered with an overhead hood system including units 56, 58, 60, 62, 64 and 66 which successively provide heat zones of 300°F, 400°F, 600°F, 1500°F, 1750°F and 1900°F, respectively. By this arrangement, the pellets discharged from the grate 54 preferably are heated to a temperature of about 1900°F to secure in the pellets a crushing strength in the range between about 250 to 300 pounds so as to be discharged — without breakage — into the reduction step. As shown, the grate 54 is provided adjacent its underside with an exhaust system 70 for drawing the hot air gases from a supply source 72 through the grate 54 which is of a permeable construction. Moreover, the portion of the exhaust gases are recycled, as at 74, to the drying hood 50 while another portion is recycled, as at 76, to provide the primary hot air for the units 56, 58 and 60, for example. Further, a portion of the exhaust gases can be diverted, as at 78, for primary hot air to the unit 56, for example. In addition, any fines collected in the duct work plus any spillage is collected via suitable conveyors (not shown) and recycled with the subsequently separated magnetic fines for reprocessing, as desired.

Figure 2:
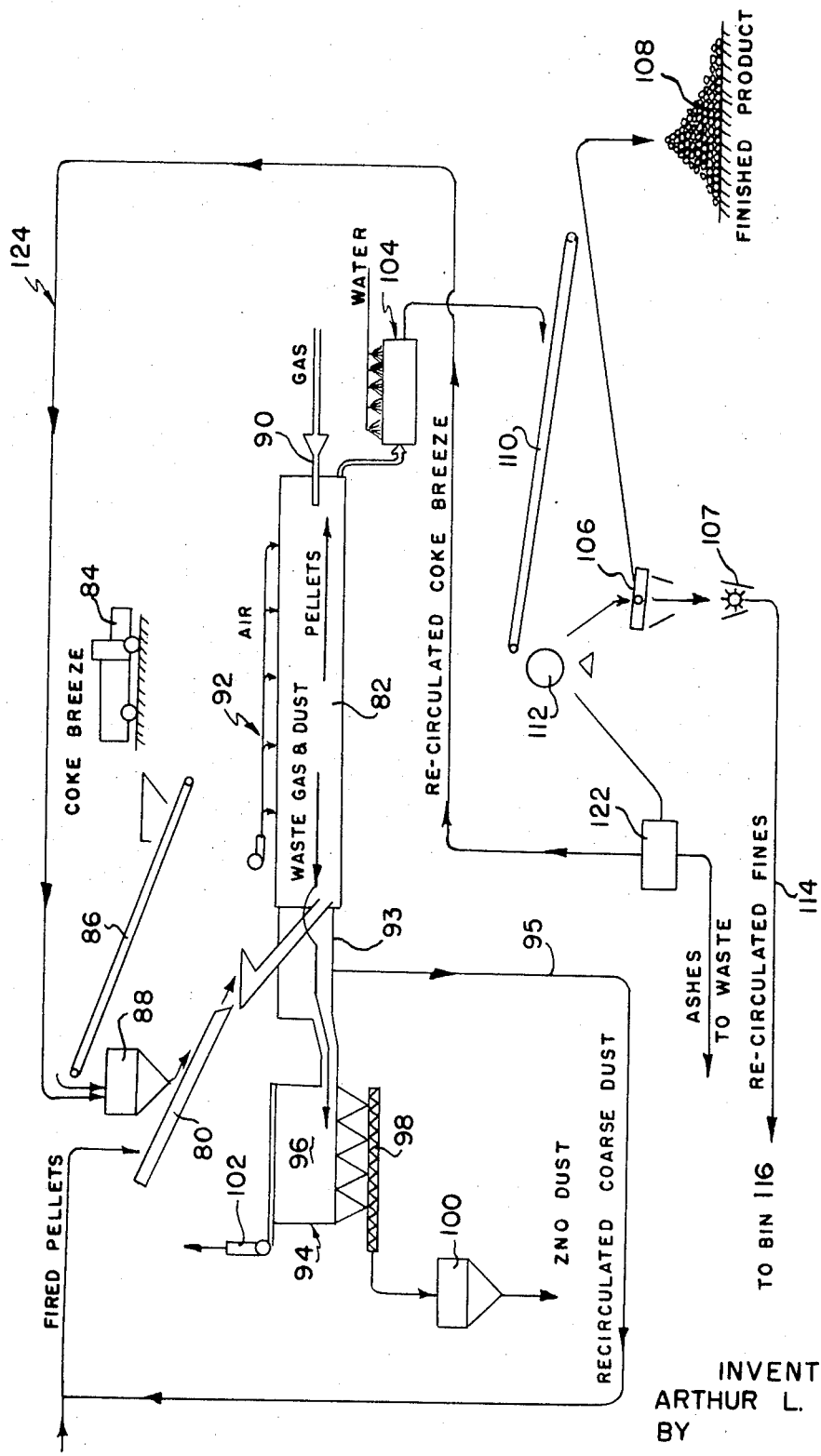
FIG. 2 is a similar schematic flow sheet for reduction of the produced agglomerates and for recycling usable fines in accordance with the invention.

As best seen in FIG. 2, the fired or heat-hardened pellets are discharged from the grate 54 onto a chute 80 that directly feeds the pellets into a rotary kiln furnace 82. Preferably, a solid reductant, such as coke breeze, delivered to the site by a truck 84 is delivered into another chute 86 for discharge into a collecting bin or hopper 88. The reductant is discharged from the base of the hopper 88 onto the chute 80 for simultaneous and uniform mixing with the pellets for delivery into the kiln 82. A small blower (not shown) may be used at the inlet to the chutes 80 and 86 so as to maintain the same under positive pressure, thereby eliminating any gases from the chutes. The reductant, such as coke breeze, may be provided as a fraction of minus one-fourth inch in size and is preferably added with the pellets in an amount of about 30 percent, by weight, of the pellets.

In the form shown, the kiln 82 is fired at one end by a gaseous fuel via a gas burner, as at 90, disposed adjacent the outlet and of the kiln together with fresh air discharged into the kiln via a blower system, as at 92, to provide a substantially uniform temperature and atmosphere in the kiln. The kiln is preferably provided with internal thermocouples and instant waste gas analyzers (not shown) to provide such control. Preferably, the temperature within the kiln is maintained within a range between about 1400°F to 2500°F with the preferred temperature between 1900°F and 2000°F being maintained in the vicinity of the pellets and in the space above the pellets. By this arrangement, the reducing conditions in the kiln are characterized by the formation of a reducing atmosphere within and/or in proximity to the pellets and an oxidizing atmosphere in the free kiln space above the pellets. Accordingly, at these controlled temperature conditions the iron values of the pellets are reduced to metallic iron together with the volatilization of zinc and other impurities. The reducing reactions of the iron and zinc values generally take place at approximately equal temperatures, but the presence of zinc ferrite enables the reduction of total iron into metallic iron before dezincification takes place. The volatilization of zinc is governed by the following reactions:

In the feed
$$C + \tfrac{1}{2} O_2 \rightarrow CO$$
$$Z_n Fe_2 O_4 \rightarrow Z_n O + Fe_2 O_3$$
$$Z_n O + CO \rightarrow Z_n + CO_2$$
$$C + CO_2 \rightarrow 2 CO$$
In the free kiln space
$$CO + \tfrac{1}{2} O_2 \rightarrow CO_2$$
$$Z_n + \tfrac{1}{2} O_2 \rightarrow Z_n O$$

In the presence of oxidic lead compounds, the following reactions lead to the volatilization of lead:
In the feed
$$Pb O + CO \rightarrow Pb + CO_2$$
$$Pb \text{ (liquid)} \rightarrow Pb \text{ (gas)}$$
In the free kiln space
$$Pb \text{ (gas)} + \tfrac{1}{2} O_2 \rightarrow Pb O \text{ (gas)}$$
$$Pb O \text{ (gas)} \rightarrow Pb O \text{ (solid)}$$

The reactions taking place in the free kiln space depend largely on the temperature and the oxidation potential of the kiln gases. Pre-reduction of the iron oxide contained in the pellets is governed by the following reactions:
$$3 F_2 O_3 + CO \rightarrow 2 Fe_3 O_4 + CO_2$$
$$Fe_3 O_4 + CO \rightarrow 3 Fe O + CO_2$$
$$Fe O + CO \rightarrow Fe + CO_2$$

Therefore, for the Zn volatization, also the following reaction can take place:
$$Zn O + 3 Fe O \rightarrow Fe_3 O_4 \pm CO_2$$

In the invention, the combustion gases flow through the kiln 82 in counter-current relation with respect to movement of the pellets through the kiln which travel in a direction, as shown by the arrow. The exhaust gases from the kiln 82 are discharged into a dust collecting system 94 that enables particles of zinc and lead bearing dust to be collected by a bag dust collector 96, or electrostatic precipitator, and to be removed by a screw conveyor 98 for subsequent discharge into a collecting bin 100. The gases collected within the chamber 96 may be cooled to a temperature between about 650°F to 750°F. Having been thus cleaned, they are exhausted to the atmosphere via stack 102. It has been found that the dust collected in the system 94 contains about 65 percent to 67 percent Zn, or 82 percent to 84 percent ZnO with about 7 percent to 8 percent Pb, which is an acceptable product for zinc smelting. Any coarse dust which collects in the conduit 93 between the kiln and the dust collector 96 is recirculated through conduit 95 to the chute 80.

The pellets exiting from the kiln 82 have an iron content in excess of 85 percent and preferably have an iron content between about 85 percent to 90 percent of which more than 80 percent is metalized and which contains less than 0.2 percent zinc. The metalized pellets together with any materials are then discharged from the kiln counter-current to the combustion gas flow into a separate cooling system 104. The cooling system preferably includes a conventional type rotary cooler 106 which may be cooled by a water spray and by blowing fresh atmospheric air into the cooling chamber, or adding water directly onto the pellets via sprays inside the cooling chamber. Accordingly, it will be seen by this arrangement that the hot exhaust gases in the kiln are directed in a direction away from the cooling system 104 so that the metalized pellets can be cooled in a controlled atmosphere without contamination from the products of combustion in the kiln.

As a modification, depending upon the sulphur content of the dust and the ultimate use of the pellets, a desulphurization agent, such as calcium carbonate, may be added to the kiln during the reduction step. Preferably, the calcium carbonate is added in an amount of about 6 percent, by weight, of the pellets and preferably has a grain size of minus 1/16 inch. However, larger or smaller percentages of calcium carbonate may be added depending on the amount of sulphur contained in the pellets.

In the invention, the cooled material including the metalized pellets from the cooling system 104 is delivered by a conveyor 110 onto a magnetic separator 112, which separates the metallic from the non-metallic fraction of the material. The metallic fraction is screened on a screen 106 into an oversize fraction, such as +174 inch, which may be stockpiled as at 108 for subsequent recharge into a metallurgical furnace. The undersize fraction, such as -¼ inch, from screen 106, is passed through a crushing device 107, preferably a Hammermill, from whence it is recirculated by conveyor 114, bin 116 and conveyor 117 into the pelletizer system. The recirculated metallic fines are of a size smaller than 1/16 inch.

The non-magnetic fraction of the discharge material from the cooler and from the subsequent magnetic separation is conveyed to an air sifting device 122 where the ashes are removed and the clean surplus coke breeze is recirculated into the coke bin 88. The ashes are disposed of.

Should calcium carbide have been added for the reduction of sulphur content in the pellets a screen (not shown) is added between the magnetic separator 112 and the windsifter 122 to remove the minus 1/16 inch fraction of the non-magnetic material, which will be discarded.

I claim:

1. A process for producing agglomerates from waste materials of the type containing ferrous and zinc values; producing highly metallized agglomerates as well as recovering zinc values from waste materials from such agglomerates, the process comprising, providing waste materials containing said values in dust form from one or more sources, collecting and separating said dust in accordance with the zinc content thereof, separately storing said separated dust in accordance with the zinc content thereof, selectively discharging pre-selected amounts of said separately stored dusts for blending together to provide a product having a predetermined zinc content therein, blending said amounts of said various assorted dusts to form a substantially homogeneous product containing said predetermined amount of zinc therein, wetting the said product sufficient to moisten the same, pelletizing said product into predetermined size pellets, pre-drying the pellets at a temperature from ambient to 300° F. for a time to produce green pellets with a strength sufficient for subsequent handling, heat-hardening said pre-dried pellets at successively increased temperatures in a range between 300° F. to 1900° F., introducing the heat hardened pellets together with a solid reductant into the inlet end of a reducing furnace, subjecting the pellets and reductant within the furnace to a temperature between 1400° F. to 2500° F. by flowing combustion gases in counter-current relation with respect to the travel of pellets toward the outlet end of the furnace so as to form a reducing atmosphere in the vicinity of the pellets and an oxidizing atmosphere in the free space above the pellets in the furnace so the pellets are reduced to have an iron content in excess of about 60 percent of which in excess of 80 percent is metallized, and so that the zinc values of the pellets are volatilized, separating the volatilized zinc values from the metallized pellets, and cooling the metallized pellets by liquid and in the presence of atmospheric air without contamination from the combustion gases to provide as finished, the metallized pellets with a zinc content of less than about 0.2 percent suitable for re-charge into a metallurgical furnace, magnetically separating the metallized pellets formed during the process into a magnetic fraction, separating said magnetic fraction into a larger size fraction and a smaller size fraction, and recycling a portion of said smaller size magnetic fraction in the process commencing with the said pelletizing step.

2. A process in accordance with claim 1, wherein said dust is in dry and wet form.

3. A process in accordance with claim 1, wherein said dust is in dry form, said dry dust is comminuted before being blended, and said comminuting includes reducing a major portion of said dust to about a −200 mesh size.

4. A process in accordance with claim 1, wherein said dust is in wet form and is dried and filtered before being blended, and said moisture content of said dust in wet form is reduced to about 8 percent.

5. A process in accordance with claim 1, wherein the heat-hardening temperature is increased in incremental steps to provide in the pellets a crushing strength in the range between about 250 to 300 pounds.

6. A process in accordance with claim 1, including adding a desulphurizing agent during said reduction based on the weight of said pellets.

* * * * *